(No Model.)
H. LEFFMANN.
MANUFACTURE OF CARBONIC ACID AND HEAVY MAGNESIA.
No. 383,957. Patented June 5, 1888.
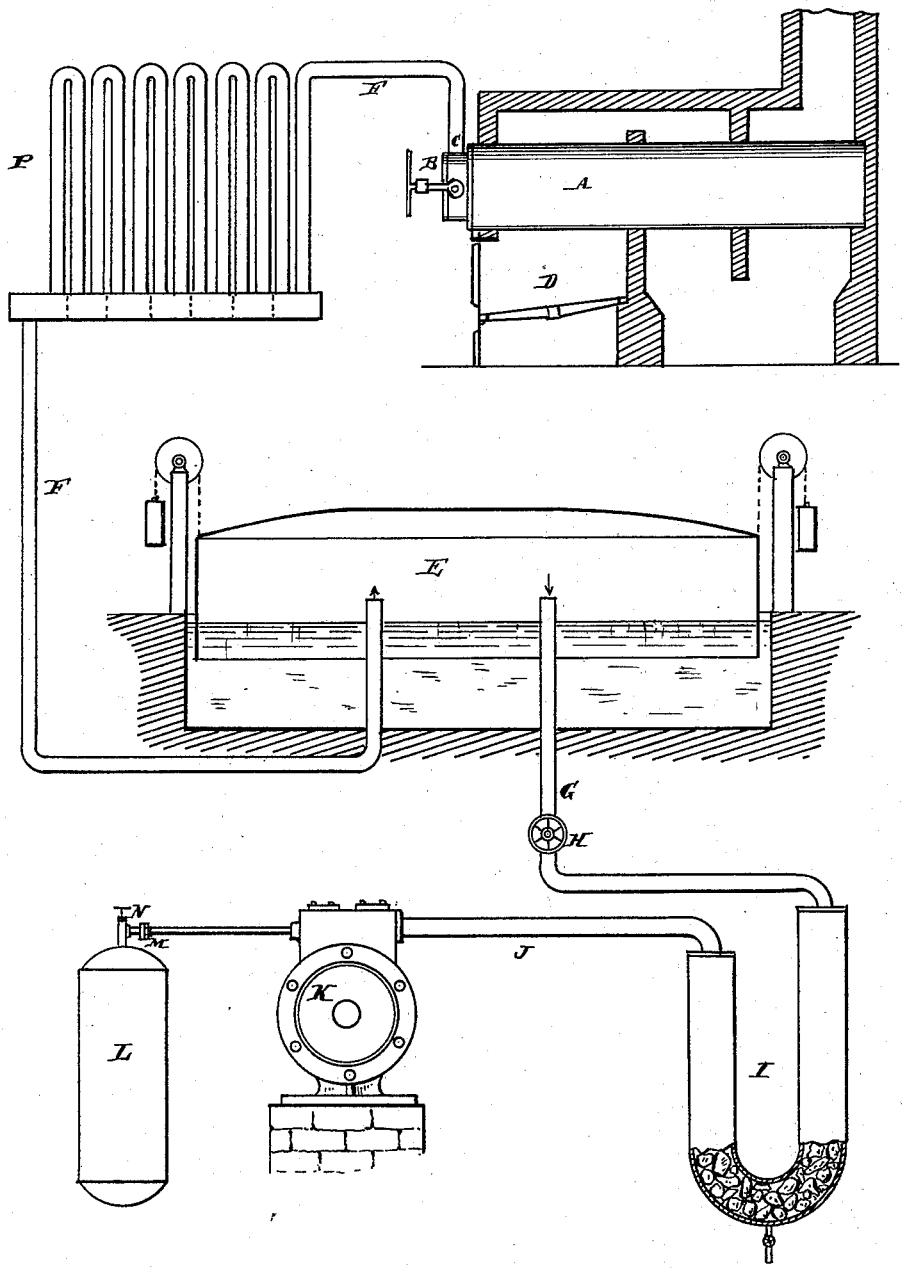

UNITED STATES PATENT OFFICE.

HENRY LEFFMANN, OF PHILADELPHIA, PENNSYLVANIA.

MANUFACTURE OF CARBONIC ACID AND HEAVY MAGNESIA.

SPECIFICATION forming part of Letters Patent No. 383,957, dated June 5, 1888.

Application filed July 16, 1887. Serial No. 244,442. (No specimens.)

*To all whom it may concern:*

Be it known that I, HENRY LEFFMANN, of the city and county of Philadelphia and State of Pennsylvania, have invented an Improvement in the Manufacture of Carbonic Acid and Heavy Magnesia, of which the following is a specification.

My invention has reference to the manufacture of carbonic acid and extra-heavy magnesia for commercial purposes; and it consists in certain improvements fully set forth in the following specification, and shown in the accompanying drawing, which forms part thereof.

Heretofore carbonic acid and magnesia of commerce have been made from distinct substances and with no very satisfactory results. The customary manner of producing carbonic-acid gas is to treat powdered limestone or carbonate of lime with sulphuric acid, setting free the carbonic acid and producing calcium sulphate as a by-product. In the case of the manufacture of magnesia used in commerce the process is much less direct. It was customary to make a solution of magnesium salts from the rock by treating it with acid, then precipitating the magnesia by means of carbonate of soda, and after drying the precipitate igniting it. These processes, which are more or less complicated in their way, I dispense with and produce the two substances in a most abundant manner from the same source and with the employment of very simple apparatus. Furthermore, the magnesia produced by my process, hereinafter set out, is extra-heavy magnesia, a far more valuable product than the precipitated magnesia at present used commercially. The native carbonate being much denser than any artificial carbonate, and magnesia being infusible at any temperature, there is no danger of converting it into lighter forms. It remains heavier than any magnesia produced from artificial carbonates, and by loss of carbonic acid the magnesia becomes more readily soluble, permitting the preparation of magnesia salts with more ease and convenience than when made from carbonates directly.

I am aware that it has been proposed to use magnesian limestone or dolomite for the production of carbonic acid; but this will not answer my purpose for the preparation of extra-heavy magnesia, for the calcium oxide which would of necessity be in the residue would interfere with the special uses to which pure magnesia is applied, and the processes for the removal of this calcium oxide would reconvert the magnesia into its ordinary very light condition; hence this process would be of no use whatever, and could not produce a heavy pure magnesia for commercial purposes. Magnesian limestone is not the same as magnesite, as the mineralogical and chemical qualities are very different. It has also been proposed to make what is called "magnesia levis" by heating so-called "heavy carbonate of magnesia;" but this is not the equivalent of my process, employing native magnesite, for the so-called "heavy magnesium carbonate" is a precipitated material requiring a special process to produce it, and the term "heavy" is a comparative one, as the magnesia is simply a little denser than that prepared by the earliest processes. My magnesia is so very heavy that all the above forms may properly be considered light magnesias.

It has been the object of chemists to endeavor to secure an extra-heavy magnesia, and the use of the term "heavy," as heretofore used, has only been relative. The effort of the art has been to secure a magnesia having a dense granular character, the ordinary form being fluffy and inconveniently light. By laboratory experiments a slight gain in density was obtained; but it was far less than that which I can readily and directly produce by heating pure native magnesite; and this extra-heavy magnesia, which I have succeeded in commercially producing, has many uses in the arts not heretofore possible with the lighter form, as above referred to. For certain purposes— cements and tooth-powder, for instance— magnesia made by the processes given in the chemical and pharmaceutical works is quite inapplicable, being too light.

The magnesia produced by my process may be used with advantage in the manufacture of ammonia, being heated with ammonium sulphate, yielding magnesium sulphate, (Epsom salt,) or with ammonium chloride, yielding magnesium chloride, an ingredient of a valuable cement. These methods of producing important chemicals are impracticable under the old method of making magnesia, because of the cost of it and the bulkiness of the product.

By the process of heating magnesite, as described, I secure a form of magnesia for commercial purposes which is an improvement in the direction in which the art has been striving—that is, toward overcoming the peculiar lightness in which magnesia usually presents itself.

In carrying out my invention I employ magnesite or magnesium carbonate, which, after crushing, I place in a retort, and from which the carbonic acid is distilled by applying adequate temperature. The carbonic-acid gas so generated is more or less pure and requires but little attention for purification. The gas, after leaving the retort, passes through the cooler to reduce its temperature and volume. It then enters a gasometer or holder, where it is stored and by which the gas may be supplied to the compressor in a continuous manner. From the holder the gas is led through a drier containing any well-known drying medium, and is finally compressed into vessels under sufficient pressure to liquefy the dried and cooled gas. With the decomposition of the magnesite and the distillation of the carbonic acid we have the production of magnesia, not of the kind commonly found in the market, but an extra-heavy magnesia, which is a valuable compound, and has heretofore not been easy of production.

My process is extremely simple, requiring for the production of its product only a well-known mineral, and means to apply the heat when taken in connection with the necessary apparatus for storing the acid. There are no complicated reactions necessary, nor are there several steps in the process required; and practice has shown that the substances may be produced in the most abundant and speedy manner by carrying out the herein-described invention.

In the drawing is shown a diagram illustrating the apparatus necessary for the carrying out of my invention on a commercial scale.

A is the retort, and has the usual charging-door, B, and gas-escape flue C. This retort is more or less similar to a retort used in the manufacture of illuminating-gas by the destructive distillation of coal, and is heated by a furnace, D, or otherwise, so as to obtain a moderate temperature, which may be about 750° centigrade. The amount of heat required depends upon the pressure of the atmosphere surrounding the magnesite while being decomposed, and we may say that the less the pressure the less the heat required. For this reason I prefer to so weight or otherwise counterpoise the gas-holder E in such a manner that all back-pressure is removed from the retort; and, if desired, this may be carried to such an extent that there is an actual suction produced in the retort, causing the carbonic-acid gas to pass off from the magnesia at an extremely low temperature. To so weight or construct the holder does not increase the cost of manipulation, and it certainly does reduce the consumption of coal or other heat-giving substance used to heat the retort, and this does appreciably reduce the cost both as to the manufacture of the carbonic-acid gas and the heavy magnesia. The gas, after leaving the retort, passes through the cooler P and by pipe F into the holder, as aforesaid; and from the holder it passes through a pipe, G, having a valve, H, to the drier I, which may be of any construction—that shown being a good form—and consisting of a U-shaped tube of earthenware or substance not affected by acid, which is filled with pumice-stone saturated with sulphuric acid, and over which the carbonic-acid gas is drawn before being compressed into the storage-vessel, whereby it is made perfectly anhydrous. After leaving the dryer I the gas is passed by pipe J to the compressor K, by which it is compressed, under a pressure of about five hundred pounds to the square inch, into the storage and shipping vessels L, having the disconnectable joint M and the valved outlet N.

In place of sulphuric acid in the drier chloride of calcium may be used or anhydrous copper sulphate may be employed.

The valve H may be closed when the compressor K is not working.

The heavy magnesia may be withdrawn from the retort as soon as the carbonic acid has passed off, and it will be found very heavy and in the active condition. So far as the manufacture of the magnesia is concerned the retort may be open and the carbonic acid may be allowed to go to waste.

I do not limit myself to the apparatus here shown in carrying out my invention, as it may be modified in various ways without modifying its general features or the essential principle of the process.

Having now described my invention, what I claim as new, and desire to secure by Letters Patent, is—

1. The process for the production of extra-heavy magnesia, consisting in subjecting native magnesite to the action of heat.

2. The herein-described process for the simultaneous production of carbonic acid and extra-heavy magnesia, consisting in subjecting native magnesite in a closed retort to the action of heat, which decomposes the native magnesite into carbonic acid and extra-heavy magnesia, then drawing off the carbonic-acid gas from the retort, and finally removing the extra-heavy magnesia.

3. The herein-described commercial extra-heavy magnesia, formed from native magnesite, as an improved article of manufacture.

In testimony of which invention I hereunto set my hand.

HENRY LEFFMANN.

Witnesses:
R. M. HUNTER,
FRANCIS S. BROWN.